July 26, 1932.  J. C. SLONNEGER  1,868,545
TINNING MACHINE
Filed Dec. 5, 1929    5 Sheets-Sheet 1
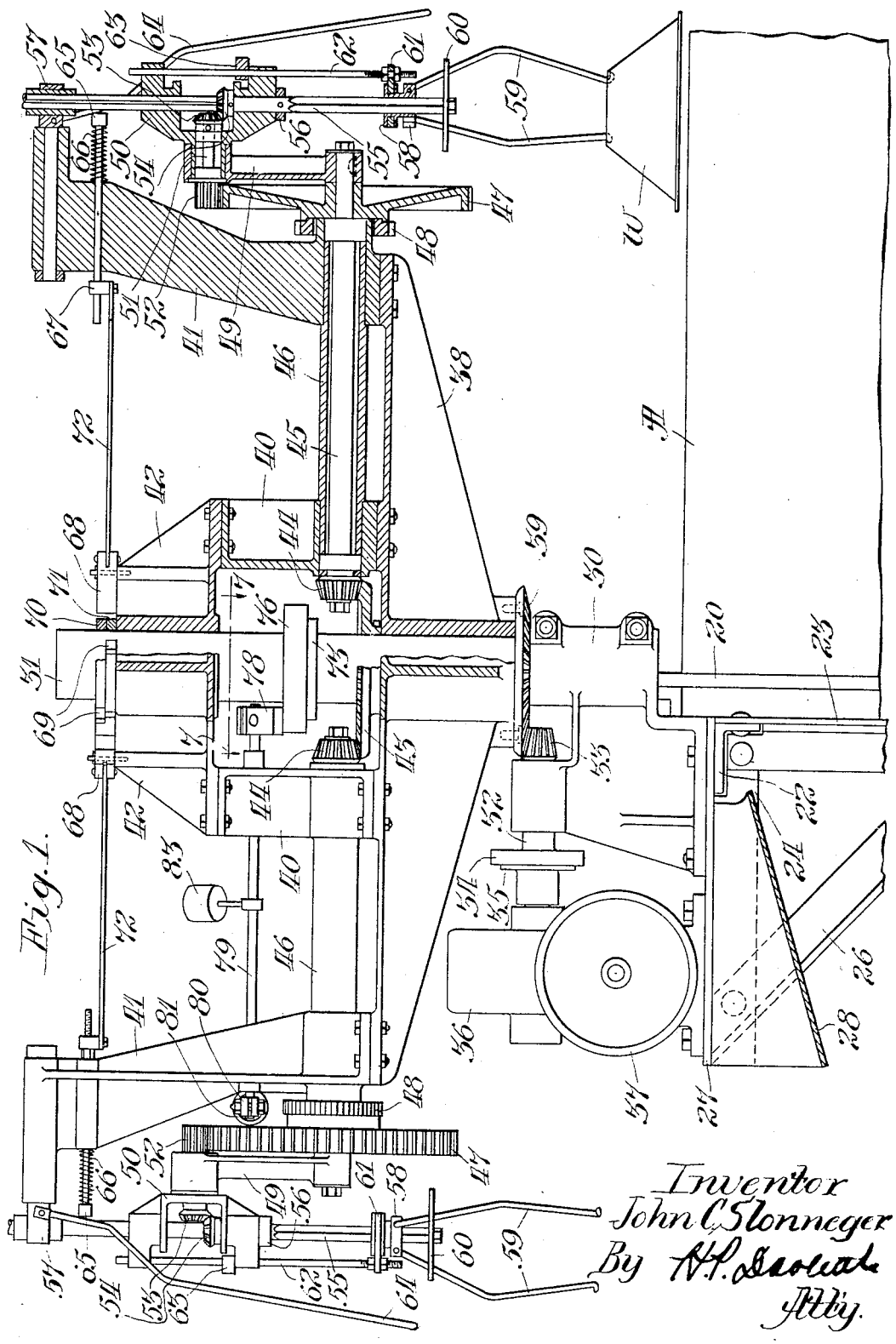
Inventor
John C. Slonneger
By H. P. Garlock
Atty.

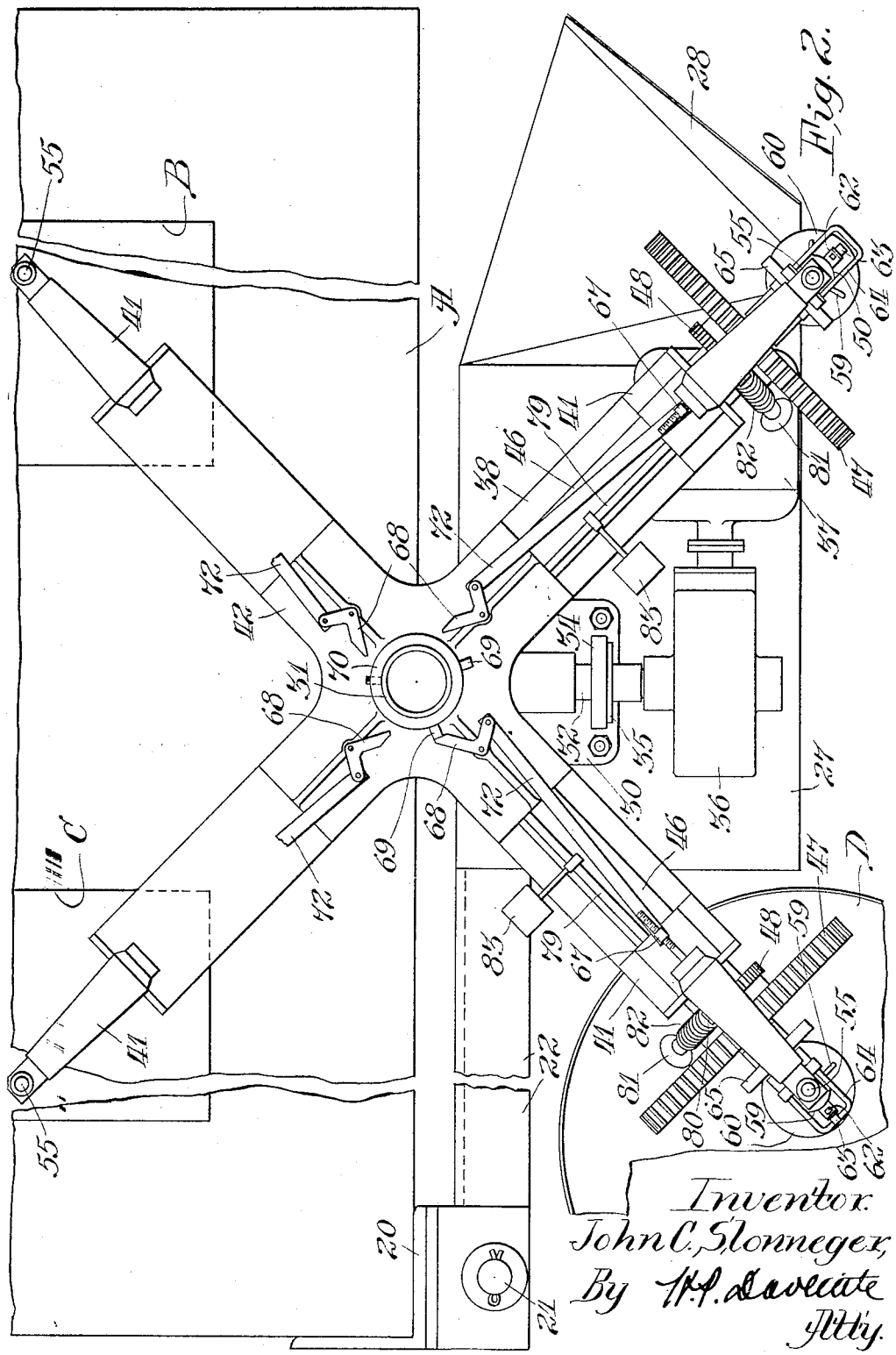

July 26, 1932. J. C. SLONNEGER 1,868,545
TINNING MACHINE
Filed Dec. 5, 1929 5 Sheets-Sheet 3
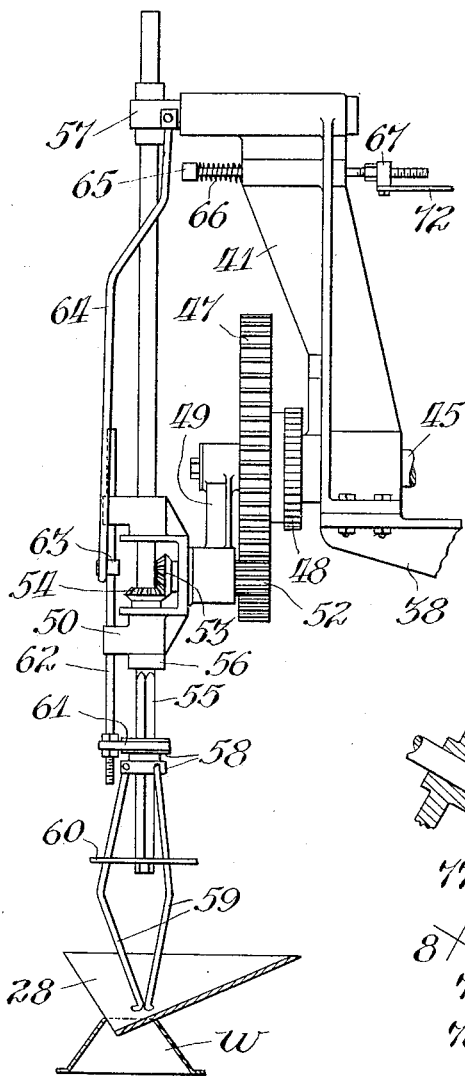
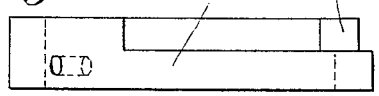
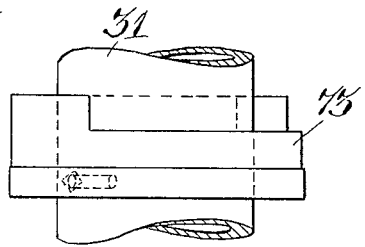
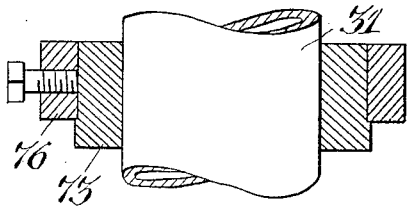
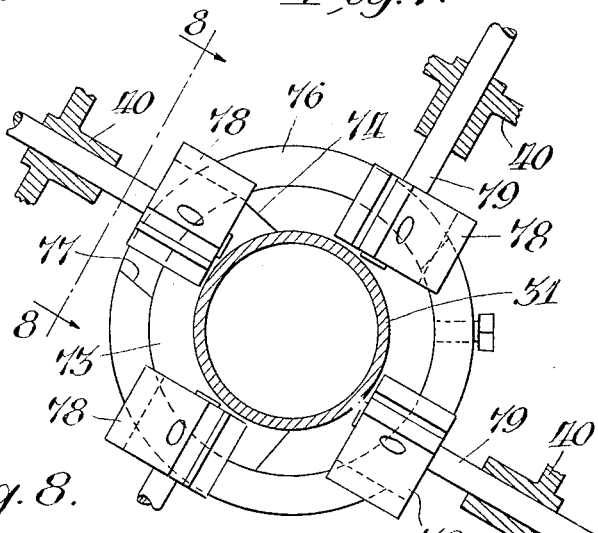
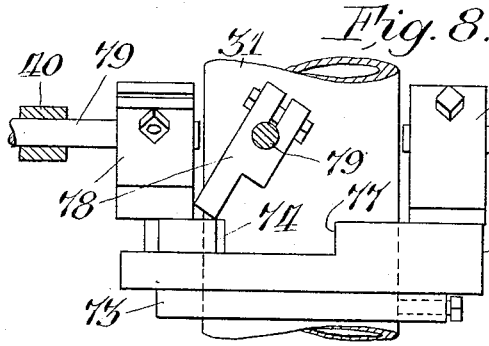
Inventor.
John C. Slonneger,
By [signature]
Atty.

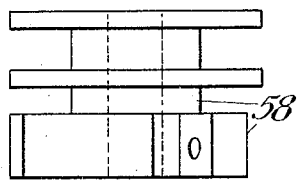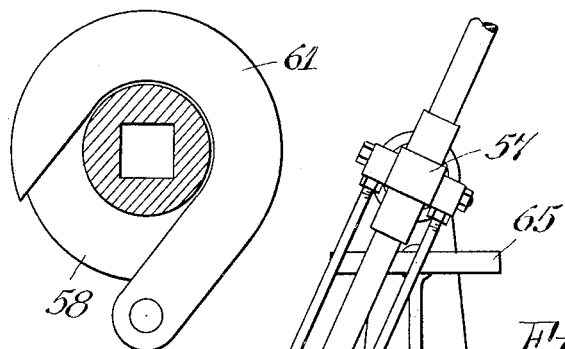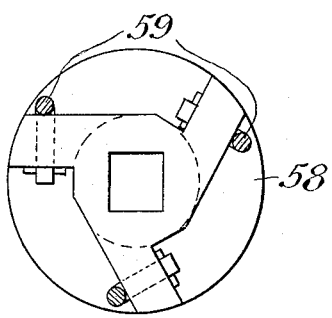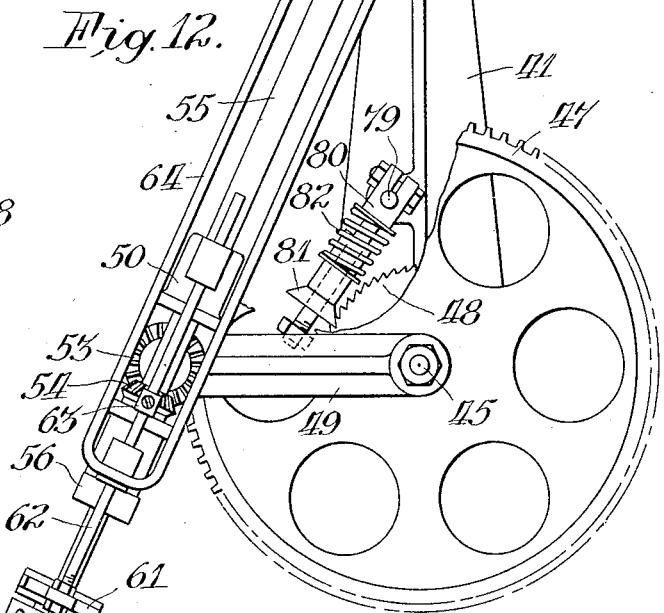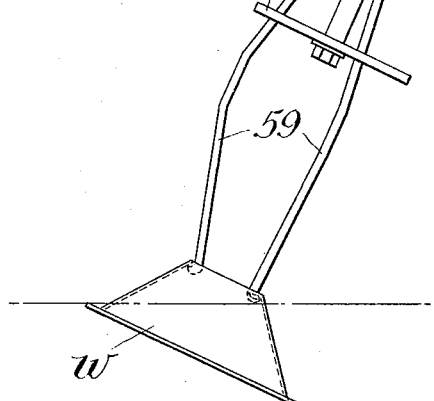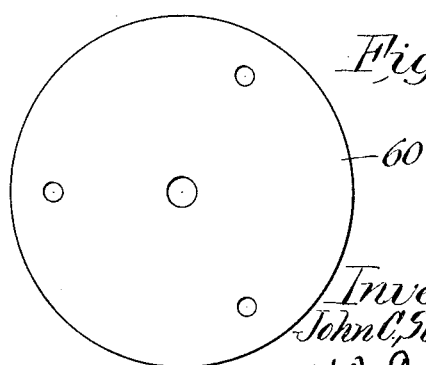

July 26, 1932. J. C. SLONNEGER 1,868,545
TINNING MACHINE
Filed Dec. 5, 1929 5 Sheets-Sheet 5
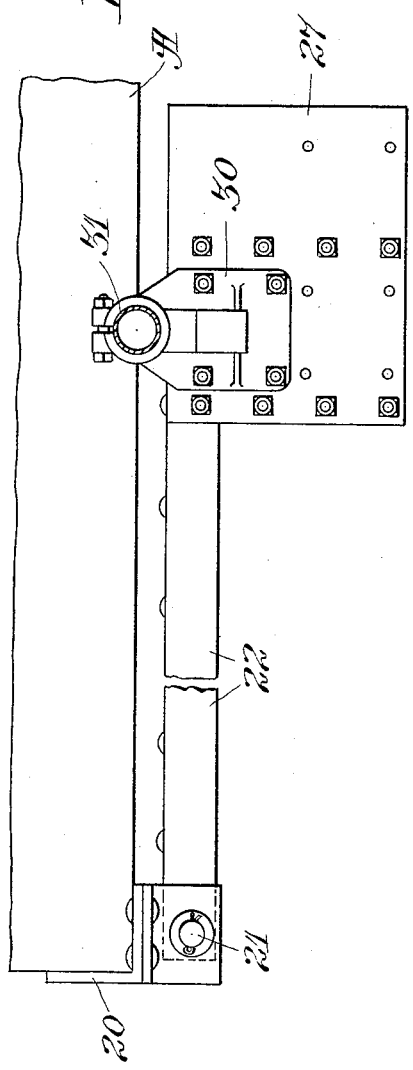
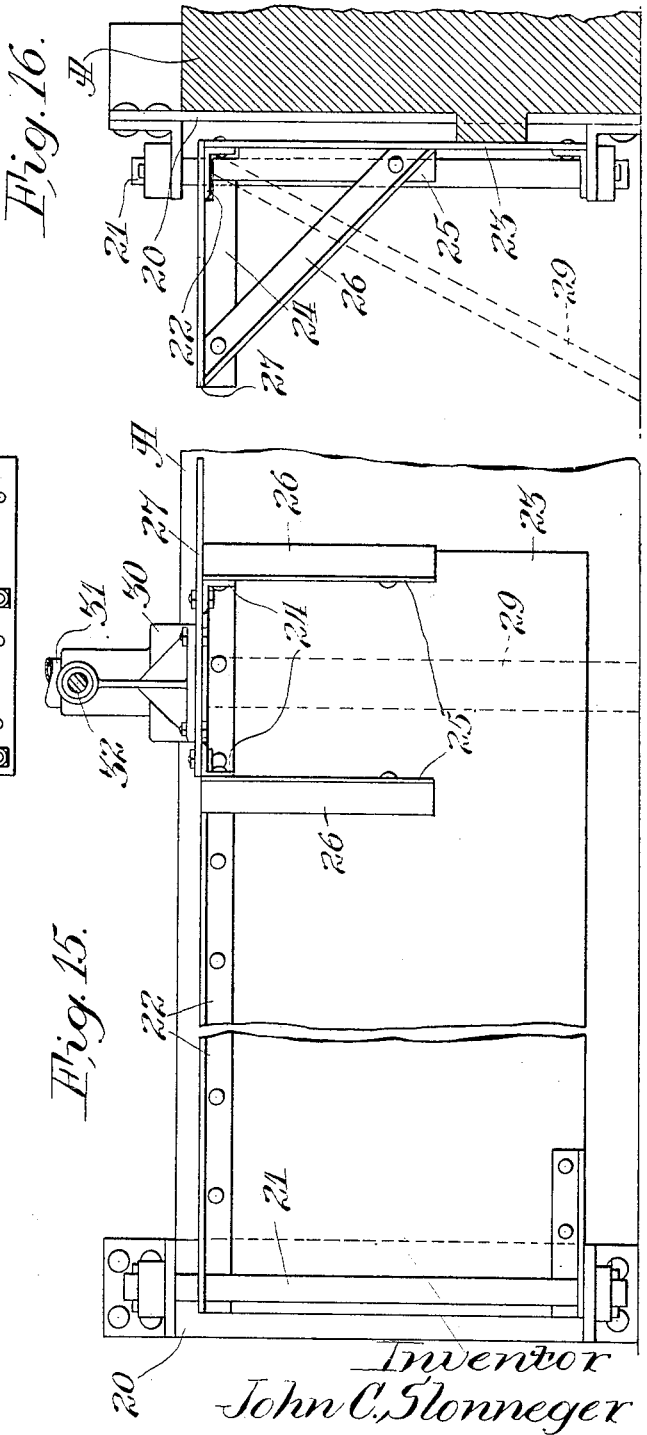
Inventor
John C. Slonneger
By H.P. Doolittle
Atty.

Patented July 26, 1932

1,868,545

UNITED STATES PATENT OFFICE

JOHN C. SLONNEGER, OF MILWAUKEE, WISCONSIN, ASSIGNOR TO INTERNATIONAL HARVESTER COMPANY, A CORPORATION OF NEW JERSEY

TINNING MACHINE

Application filed December 5, 1929. Serial No. 411,743.

This invention relates to a tinning machine.

The purpose is to provide a machine arranged adjacent a tin pot, a tallow pot and a cooling tank, the machine to embody structure for holding a part to be tinned, said part being immersed in the tin bath, then in the tallow pot, and finally in the cooling tank where the part is automatically released.

The primary object of the invention, of course, is to provide an improved machine for tinning metal parts in an economic, expeditious manner, and eliminating all hand labor except that of loading the machine.

Another important object is to provide mechanism to cause the part to be tinned to enter the tin bath at an angle to the vertical, and also to cause the part to leave the tin bath at an angle, after the part has been immersed.

Still another object is to provide means which will rapidly spin the tinned part in the hot tallow bath for the purpose of smoothing and eliminating rough particles from the freshly tinned part.

A further object is to provide four arms, each performing four cycles successively, the first arm being loaded, while the second arm is passing a part through the tin bath, the third arm is passing its part through the hot tallow bath and removing it therefrom with a spinning action, and the fourth arm is discharging its part into the cooling tank.

Also it is an object to mount the whole machine on a pivot, so as to make it possible to swing the machine away from its normal position over the pots, in the event the tallow should accidentally catch fire.

Other important objects will be apparent to those skilled in this art as the description of the invention progresses.

Briefly, these very desirable objects may be achieved in one practicable embodiment of the invention to be shown in the drawings, wherein is illustrated a pivoted frame, normally held against swinging movement in a position over a tin pot, a tallow pot, and a cooling pot. The machine embodies a vertical column upon which rotates a cross, each arm thereof carrying a spindle, and work holding means. The holding means on one arm grips the work, then the arm passes it to the tin bath, dips it thereinto at an angle and removes it therefrom, also at an angle. Next, the arm moves to the tallow pot where mechanism causes the work to be spun very rapidly as it is withdrawn from the tallow. Next, the work is passed to the cooling tank, where the work is automatically released from the holding means and dropped into the cooling tank, as will later appear, all steps being performed in succession by each arm, all arms simultaneously being in operation. The machine is power driven.

In the drawings,—

Figure 1 is a vertical elevational view of the tinning machine, the right hand side being sectioned;

Figure 2 is a top plan view of the machine;

Figure 3 shows a vertical, elevational view of an operating and work holding unit, with the parts in loading position;

Figure 4 is a detail side view of the "throw out" cam for the tinning means of the machine;

Figure 5 is a view of the same cam means associated with a second or "throw in" cam and mounted in position on the main column;

Figure 6 is a vertical, sectional view through the assembled cam structure;

Figure 7 is a part sectional view of the tinning mechanism as seen along the section line 7—7 appearing in Figure 1;

Figure 8 is an elevational view, partly in section, of the tinning mechanism, as viewed along the line 8—8 appearing in Figure 7, when viewed in the direction of the arrows;

Figure 9 is an end elevational view of the operating and work holding means in the position assumed by these parts as the tallow dipping step is terminated;

Figures 10, 11 and 12 are various detail views;

Figure 13 is a face view of a washer for the work holder prongs;

Figure 14 is a plan view of the framework which carries the machine;

Figure 15 is a front elevational view of the same framework; and,

Figure 16 is an end view of the framework.

In tinning, a large trough A is utilized, which is divided appropriately into a pot B containing molten tin, and a pot C containing a hot fatty oil or tallow (see Figure 2). Adjacent the trough is positioned a tank D containing a cooling liquid, such, for example, as kerosene.

An upright frame piece 20 is secured to the front, left hand corner of the trough A, as shown best in Figures 14, 15 and 16, said frame piece including top and bottom brackets which carry journals for a turnable, vertical shaft 21. Suitably connected to and carried by the shaft 21 is an upper horizontally disposed angle sill 22, which carries a vertically disposed plate 23, normally arranged along the front, vertical wall of the trough A. Toward the right hand end of the angle 22 are provided two spaced angle bars 24, which extend out forwardly, as best appears in Figure 16. The plate 23 carries two downwardly extending angles 25. Between the lower ends of these angles and the angles 24 are connected diagonal braces 26. The structure described carries a bed 27, upon which the tinning machine of this invention is mounted. Connected to the bed 27 and extending to the right therefrom is a trough 28 which constitutes the loading point for the tinning machine which is carried on the bed plate 27. A prop 29 is arranged in the manner indicated in dotted lines, to hold the frame against the trough A. This prop is designed to be easily displaceable to permit of swinging the whole framework quickly away from the trough A, about the shaft 21, for a purpose later to appear. It is to be noted that the tin pot, the tallow pot, the cooling tank, and the loading trough are each rectilinearly spaced apart relative to each other, each being located in an angle of the square formed (see Figure 2).

Proceeding now with a description of the tinning machine per se, it will be seen that the bed plate 27 has bolted thereto, as appears best in Figures 1 and 2, a column bracket 30, in which is rigidly fixed an upright column 31. This bracket also serves as a journal for a shaft 32 carrying an integrally formed drive pinion 33. Said shaft also carries, but at its other end, an overrunning clutch coupling 34, 35, —35 being attached to the drive end of the worm gear reducer enclosed in the case 36. The reducer gearing is driven from a motor 37 made fast on the bed plate.

A cross-shaped, four-armed turntable 38 is rotatable about the fixed column 31, said table being driven from a horizontal gear 39 formed therewith and meshing with the drive pinion 33, already described. Mounted on each arm of the turntable is an inner upright bracket 40 and an outer upright bracket 41; thus, there are four inner and four outer brackets. The four inner brackets 40 are tied together by an upper tie bracket 42 which is turnably mounted on the fixed column 31. At 43 is shown a horizontally disposed bevel gear which is fixed to the vertical column 31 and in mesh with four pinions 44, severally fixed to four crank shafts 45. Said shafts are so arranged that one is above each cross arm of the turntable, said arrangement being achieved by providing suitable journals for said shafts in the inner brackets 40 and the outer brackets 41. Each shaft is protected by a spacer sleeve 46 fitted between the inner and outer brackets.

At the outer end of each shaft 45 is loosely mounted a relatively large spur gear 47, and to each said gear is attached a ratchet wheel 48. Made fast to the outer end of each shaft is a crank arm 49. The free ends of the crank arms carry for free rotation, spindle carriers 50. Each carrier 50 includes a spindle drive shaft 51 carrying an integrally formed spur pinion 52 of relatively small size, said pinion 52 being in mesh with the loose gear 47. See also Figures 3 and 9. The carriers 50 are bifurcated to provide a space for a bevel gear 53 carried on the outer end of the spindle shafts 51, which mesh with complementary bevel gears 54 carried on spindles 55. Each spindle 55 is carried in its spindle carrier for both rotative and axial sliding movement, its axial motion being restricted or limited by the bevel gear 54 and a collar 56. Both the gear 54 and collar 56 carry guides ridable in a groove in the spindle which causes these parts to turn with the spindle but permits the spindle to slide through these parts. Each spindle 55 is guided by a spindle pivot 57 rotatably carried in the outer brackets 41, said pivots permitting turning and sliding movements of the spindles relative thereto.

As best appears in Figures 3 and 9, each spindle 55 carries a slidable block or shifter 58 having three spaced prongs 59 pivoted therein. These prongs slide through holes in a spindle washer 60 so disposed as to cause the lower ends of said prongs to approach or recede in radial lines from the extended axis of the spindle as the collar 58 is raised or lowered on the spindle 55. A shifter yoke 61 engages this block or collar 58 in a suitable groove provided for that purpose. A shifter rod 62 is adjustably secured to the shifter yoke 61 and slidably guided at its upper end in the carrier yoke 50. A lug 63 is secured to the shifter rod 62 between the bifurcations of the carrier yoke, and serves to limit the axial motion of the shifter rod 62 and also as a means for imparting such motion to the rod. A yoked rod 64 has its free ends arranged top-most and pivoted in the spindle pivot member 57. At 65 is shown a T-headed release plunger, which is slidable in the outer bracket 41 and normally held in contact with the yoke rod 64 through the medium of a spring 66. The release plunger 65 has secured thereto for adjustment, an adjusting block 67.

The upper bracket 42 carries on four vertical, regularly spaced pivot pins four bell crank levers 68 so disposed as to engage two spaced pins 69 carried by collars 70 and 71, (see Figures 1 and 2). These two collars are secured to the main column 31 by set screws so that the pins may be given any relative angular setting desired. It will be understood that one bell crank is provided for each cross arm unit. Links 72 connect the bell cranks 68 with the adjusting blocks 67 that carry the release plungers 65.

A cam controlled timing mechanism to regulate the spinning of the tinned work out of the tallow pot is also provided and will next be described. Looking to Figures 4, 5, 6, 7 and 8, it will be seen that the main columns 31 has secured adjustably thereto, by means of a suitable set screw, an inner cam ring 73 which constitutes the "throw in" cam having a "throw in" shoulder 74. Surrounding the "throw in" cam ring is a "throw out" cam ring 76 adjustably secured to the "throw in" cam ring by a suitable set screw, said "throw out" ring having a "throw out" shoulder 77. The angular distance between the "throw in" and "throw out" shoulders may be varied by adjusting the position of the ring 76 relative to the ring 73. At 78 are four cam levers having their lower ends ridable on the top surface of the cam rings 73, 76, each of said levers 78 being carried fast on rockable pawl shafts 79 journaled in the inner brackets 40 and the outer brackets 41. The outer ends of the pawl rock-shafts have secured thereto pawl carriers 80 that carry ratchet pawls 81 yieldable in axial directions against the pressure of a spring 82. The pawls 81 are engageable with the ratchet wheels 48 heretofore mentioned. Each pawl shaft 79 carries a counter-weight 83 to counter-balance the weight of the pawl units 80, 81.

The operation of the machine is as follows:

Power coming from the motor 37 applied through shaft 32 and pinion 33 imparts a counter-clockwise rotation to the turntable cross 38, through the bevel gear 39, about the axis of the vertical column 31. As the bevel gear 43 is fixed to said column and remains stationary, the pinions 44 are caused to roll on the bevel gear 43 in a planetary manner. The ratio of the pinions 44 to the gear 43 is one to four, hence each pinion 44 rotates four times on its axis while making one revolution about the axis of the fixed column, from which it may be seen that a complete rotation of each pinion 44 is accomplished in ninety degrees of a revolution of the turntable cross 38. The turntable having four arms, equidistantly spaced apart, the cycle of operation of the mechanism deriving its motion from the pinions 44 will be in unison on all four arms. The pinions 44, through shafts 45, rotate the crank arms 49, which impart a revolving motion to the spindle carriers 50 about the axis of the shafts 45. Each spindle 55 is thereby given a combined circular motion about each shaft axis 45 and an oscillating motion about its spindle pivot 57. Thus, the extreme points of the prongs 59 receive a motion from the proportioning of the parts, which motion in this case approximates paths comprising a four-looped cycloidal imposed or described upon the surface of a cylinder, whose radius is equal to the distance from the axis of the fixed column 31 to the points of the prongs 59. With this motion in mind, I may now describe the complete action of the machine.

It is to be assumed that the machine is in position as shown in Figure 1 with all spindles raised to their highest point. As the turntable revolves all spindles are swung forward and downward. As the first arm of the turntable cross approaches a position over the loading trough 28, the pin 69 (see Figures 1 and 2) on the collar 70 engages the bell crank lever 68 on said arm, said lever 68 withdrawing the release plunger 65 for that arm through the link 72, thus permitting the looped or yoked rod 64 to swing inward against the shifter rod 62 to engage under the lug 63, thus arresting the downward motion of the shifter 61. The spindle 55, however, continues its downward movement, carrying with it the prong washer 60. At approximately the lowermost position of the spindle, as appears in Figure 3, which would correspond to a half revolution of the crank arm 49, the prongs 59 are collapsed, and the part to be tinned is loaded onto the prongs by hand. The trough 28 is appropriately shaped as a prong guide to assist the operator in accomplishing this. The work to be tinned, as shown in the drawings, is an annular, cone-shaped disk W as used in the centrifugal type of cream separator. A cream separator disk is merely shown for purposes of illustration. Obviously any work may be tinned that the machine, as shown, or as modified within the scope of this invention, is capable of handling. Immediately the bell crank lever 68 ceases its contact with the pin 69 on the collar 70, and the spring 66 returns the release plunger 65 to its home position, forcing the yoked rod 64 outwardly, thus disengaging and freeing the lug 63. As a result, the shifter 61 is now free to drop downwardly under the force of gravity, thereby expanding the prongs 59 to cause them firmly to grip the part to be tinned. It is here pointed out that the angle made by the prongs 59 passing through the prong washer 60 is so chosen as to be selflocking with respect to upward forces applied to the lower ends of the prongs 59, hence the part to be tinned cannot be released through any force applied to it directly.

Now, as the turntable cross further revolves, the work W to be tinned is lifted upwardly to its highest point as the crank 49 completes the first revolution. The turntable cross has, of course, only accomplished a fourth of a revolution. As the motion proceeds, the work W is lowered into molten tin contained in the tin pot B located at this point. It is to be noted that, because of the pivoting of the spindle 55 about the axis of the member 57, the spindle makes an angle with the vertical at all points except the exact highest and lowest points. Hence, the work to be tinned enters the molten tin at an angle, which is very essential in the art of tinning. On reaching the lowest point, the work is completely submerged in the molten tin bath. As the motion continues, the work is lifted out of the tin, leaving the surface of the tin bath at an angle with the vertical, which also is very essential in the art of tinning, and is raised to its highest point as the crank arm 49 completes the second revolution about the axis of the shaft 45. The turntable has now completed a half of a revolution.

A bath of molten tin always carries a surface of so-called dross, which interferes with clean tining. To overcome adherence of dross to the work in process, it has been found essential to enter the work into the bath at an angle, as described, and similarly to withdraw the work from the bath at an angle. Thus, is explained the importance of the structure and operation just described.

After the half revolution of the turntable has been completed, as described, the next step in the tinning process is to douse the freshly tinned part in a bath of hot fatty oil or tallow, which functions to melt off excess and rough particles of tin, and to spin the part upon withdrawal from the bath, to leave a smooth tinning job by throwing off excess particles. Accordingly, the next fourth turn of the turntable cross-arm causes its associated mechanism to complete the next cycle in a similar manner, and, as a result, the work W is lowered into the tallow pot C at an angle. Then the spindle assumes its vertical position, with the part completely immersed. Next, the part is retracted and again at an angle, as the movement continues. As the part W is thus retracted, the cam lever 78 on the pawl shaft 79 rides off the "throw in" shoulder 74 (see Figure 8) of the "throw in" cam 73, causing the pawl 81 to be rocked into engagement with the ratchet wheel 48, thus preventing the loose gear 47 from rotating about the axis of shaft 45. So long as the gear 47 is locked in this fashion, the pinion 52 and shaft 51 are rotated on their axis, causing the gear 53 to drive the gear 54, in turn driving the spindle 55, causing the work W to be rapidly spun as it is withdrawn from the tallow pot. When the cam lever 78 rides up the "throw out" shoulder 77 on the "throw out" cam 76, the pawl shaft 79 is again rocked to release the pawl 81 from the ratchet wheel 48 to free the gear 47 for rotation on its axis again, thereby terminating the spinning of the spindle 55. As the two cam collars 73 and 76 are relatively adjustable, angularly, the distance of the drop space between the "throw in" and "throw out" shoulders may be varied to suit whatever condition is required in consideration of the kind of work to be tinned. The purpose of the rapid spinning motion, just described, is to throw off by centrifugal force the excess tin melted by the tallow and adhering to the work.

Thus, as the spindle has been retracted after the tallowing step, the highest point of the spindle marks the end of the third revolution of the crank arm 49. At the beginning of the fourth revolution, the pin 69 on the collar 71 is engaged by the bell crank lever 68 in line with the cooling tank D at this time. Therefore, in the manner previously described, the rod 72 is actuated to move the mechanism which causes the prongs 59 to be collapsed as the spindle nears its lowermost position during this last cycle. Thus, the work W is automatically freed and falls into the cooling tank D. The spindle then rises to its highest point again, to complete the fourth revolution of the crank arm 49, and one revolution of the turntable cross.

As the turntable has four arms, all four cycles of the crank arms are being performed simultaneously, thus at one position of the turntable one spindle of the machine is receiving its part; the next spindle, in a counter-clockwise direction, has immersed its part in the molten tin; the third spindle has immersed its part in the tallow; and, the fourth spindle has discharged its work into the cooling liquid.

The purpose of the hinged mounting, heretofore described, of the entire mechanism is for the convenience of accessibility and for quick removal of the machine from its normal position projected over the trough A, in case the hot fatty oil in the tallow pot C should become accidentally ignited.

The purpose of the overrunning clutch coupling 34, 35 is to permit the turning of the turntable by hand, which would otherwise be prevented, due to the employment of irreversible worm gearing in the reduced 36.

From the above detailed description, it must now be clear that structure has been provided which achieves all of the desirable objects recited at the beginning of this specification.

It is to be understood that only an illustrative embodiment has herein been shown and described by way of example, and that the machine is obviously capable of being modified and changed without departing from the spirit and scope of the invention as indicated by the character of the appended claims.

What is claimed is:

1. In a tinning machine arranged adjacent a tin pot, a tallow pot, and a cooling pot, the combination of means for holding a piece of work to be tinned, a substantially vertically disposed swingably mounted spindle carrying the holding means, means for successively moving the spindle and holding means and causing it to immerse the work in the pots in the order named, and means for causing said means to enter the work in the pots at an angle to the vertical and for retracting the work from said pots at an angle to the vertical, said work traveling in a cycloidal path in the direction of travel of the work holder.

2. In a tinning machine arranged adjacent a tin bath, a substantially vertical swingably mounted spindle including means for holding a piece of work to be tinned, means for moving the spindle in a circular path, and means for entering the work into the bath at an angle to the vertical and also for retracting the work from the bath at an angle to the vertical, said work traveling in a cycloidal path in the direction of travel of the spindle.

3. A tinning machine comprising a turntable multi-armed member, each arm provided with a slidable and rotatable spindle, work holding means for each spindle, means swingably mounting each spindle unit on the multi-armed member whereby to cause the holding means to describe cycloidal paths as the machine operates, means to lock the spindles normally against rotation, and means to cause the spindles and work holding means to rotate for a predetermined interval at a predetermined point in the turning movement of each arm with the multi-armed member.

4. A tinning machine located adjacent a tin bath, a tallow bath, a cooling bath, and a loading trough, said machine comprising a turntable having four arms revoluble as a unit, each arm carrying swingable work holding means movable in cycloidal paths and operating simultaneously so that at one position of the turntable one work holding means is in position at the trough to be loaded, the next means has immersed its part in the tin, the next means has immersed its parts in the tallow, and the last means is in position to discharge its work into the cooling bath, and means to cause said means to discharge its part at the time mentioned.

5. A tinning machine comprising a vertical column, a turntable on the column, means to revolve the turntable, brackets on the turntable, a shaft in the brackets, means to rotate the shaft, a crank on the shaft, a spindle including work holding means connected to and carried by the crank, means to rotate the spindle from the shaft, means normally preventing rotation of the spindle, and means to open and close the work holding means at predetermined times.

6. A tinning machine comprising a vertical column, a turntable on the column comprising a plurality of arms, shafts including cranks on the arms, means to rotate the shafts and cranks, spindles including work holding means carred by the cranks, means to rotate the spindles at a predetermined position of the arms, and means to open and close the work holding means at other predetermined positions of the arms.

7. In a tinning machine, a vertical column, a horizontal arm revolvable about the column, brackets on the arm, a shaft in the brackets, means to rotate the shaft, a crank rotatable with the shaft, a spindle carrier pivoted on the crank, a spindle slidable in the carrier, work holding means on the spindle, means pivotally connecting one end of the spindle to one of the brackets, means for spinning the spindle, means to regulate the time of spinning the spindle, and means to regulate the opening and closing of the work holding means.

8. In a coating machine, a support, an arm revoluble about the support, a bracket on a free end of the arm, a substantially vertically disposed spindle pivoted for to and fro swinging movement with respect to the arm and bracket, means for so swinging the spindle, means for rotating the spindle, a work holder carried at the lower end of the spindle, and means to reciprocate the spindle to open and close the work holder.

9. In a coating machine, a support, a shaft on the support, means to rotate the support about a center and to drive said shaft, a crank arm fast on said shaft, a gear loose on the shaft, a spindle carrier mounted on the crank to revolve the same about said shaft center, a spindle slidingly carried in the carrier, gearing connecting the spindle and loose gear, means to lock the loose gear to cause rotation of the spindle, and a work holder carried by the spindle.

10. In a coating machine, a support, a shaft on the support, means to rotate the support about a center and to drive said shaft, a crank arm fast on said shaft, a gear loose on the shaft, a spindle carrier mounted on the crank to revolve the same about said shaft center, a spindle slidingly carried in the carrier, gearing connecting the spindle and loose gear, means to lock the loose gear to cause rotation of the spindle, a work holder carried by the spindle, and means for automatically causing the work holder to release the work at a predetermined point in the rotation of the support.

11. In a coating machine, a support, a shaft on the support, means to rotate the support about a center and to drive said shaft, a crank arm fast on said shaft, a gear loose on the shaft, a spindle carrier mounted on the crank to revolve the same about said shaft center, a spindle slidingly carried in the carrier, gearing connecting the spindle and loose gear, means automatically to lock the loose gear to cause rotation of the spindle at a predetermined point in the rotation of the support, and a work holder carried by the spindle.

12. In a coating machine, a support, a driven shaft on the support, means to rotate the support about a center, a crank arm on said shaft, a gear loose on the shaft, a spindle carrier mounted on the crank to revolve the same concentrically about said shaft center, a spindle carried in the carrier, gearing connecting the spindle and loose gear, means to lock the loose gear to cause rotation of the spindle, and a work holder carried by the spindle.

13. In a coating machine, a support in the shape of a cross, a shaft on each leg of the support, means to rotate the support about a center and to drive said shafts, a crank arm fast on the outer end of each shaft, a gear loose on each shaft, a spindle carrier mounted on each crank to revolve about each shaft center, a spindle slidingly carried in each carrier, gearing connecting complementary spindles and loose gears, means to lock each loose gear in turn to cause rotation of each spindle at a predetermined point in the rotation of the support, and a work holder carried by each spindle.

14. In a coating machine, a vertical column, a support, means to rotate the support about the column, a bracket on the support, a driven shaft on the support, a carrier supported for concentric movement about the end of said shaft and driven thereby, a spindle slidingly mounted in said carrier and pivotally and slidingly mounted at one end on the bracket, and a work holder connected to the other end of said spindle.

15. In a coating machine, a vertical column, a support, means to rotate the support about the column, a bracket on the support, a driven shaft on the support, a carrier supported for concentric movement about the end of said shaft and driven thereby, a substantially vertical spindle slidingly mounted in said carrier and having its upper end pivotally and slidingly mounted on the bracket, means to cause rotation of the spindle in its carrier at a predetermined point in the rotation of the support, and a work holder carried by the lower end of said spindle.

16. In a coating machine, a vertical column, a support, means to rotate the support about the column, a bracket on the support, a driven shaft on the support, a crank fast on the outer end of said shaft, a carrier supported by said crank for concentric movement about the end of said shaft and driven thereby, a spindle slidingly mounted in said carrier and pivotally and slidingly mounted at one end on the bracket, and a work holder connected to the other end of said spindle.

17. In a coating machine, a vertical column, a cross, means to rotate the cross about the column, a bracket on the outer end of each leg of the cross, a driven shaft on each leg of the cross, a carrier supported for concentric movement about the end of each said shaft and driven thereby, a spindle slidingly mounted in each said carrier and each spindle pivotally and slidingly mounted at one end on a bracket, and a work holder connected to the other end of each spindle.

In testimony whereof I affix my signature.
JOHN C. SLONNEGER.